US010753956B2

(12) United States Patent
Lai et al.

(10) Patent No.: US 10,753,956 B2
(45) Date of Patent: Aug. 25, 2020

(54) MOTION DETECTING DEVICE, MOTION DETECTING SENSOR UNIT AND MOTION DETECTION METHOD

(71) Applicant: NATIONAL CHIAO TUNG UNIVERSITY, Hsinchu (TW)

(72) Inventors: Kelvin Yi-Tse Lai, Hsinchu (TW); Yu-Lin Tsai, Hsinchu (TW); Chen-Yi Lee, Hsinchu (TW)

(73) Assignee: NATIONAL CHIAO TUNG UNIVERSITY, Hsinchu (TW)

(*) Notice: Subject to any disclaimer, the term of this patent is extended or adjusted under 35 U.S.C. 154(b) by 491 days.

(21) Appl. No.: 15/601,906

(22) Filed: May 22, 2017

(65) Prior Publication Data

US 2017/0343573 A1 Nov. 30, 2017

(30) Foreign Application Priority Data

May 24, 2016 (TW) ............................ 105116053 A

(51) Int. Cl.

| | |
|---|---|
| ***G01P 1/02*** | (2006.01) |
| ***G01P 15/00*** | (2006.01) |
| ***G01P 21/00*** | (2006.01) |
| ***G01V 7/02*** | (2006.01) |
| ***G01P 15/18*** | (2013.01) |

(52) U.S. Cl.

CPC ............. *G01P 1/023* (2013.01); *G01P 15/00* (2013.01); *G01P 21/00* (2013.01); *G01V 7/02* (2013.01); *G01P 15/18* (2013.01)

(58) Field of Classification Search

CPC .......... G01P 1/023; G01P 15/00; G01P 15/18; G01P 21/00; G01V 7/02

See application file for complete search history.

(56) References Cited

U.S. PATENT DOCUMENTS

2011/0202225 A1* 8/2011 Willis .................. G01C 21/165 701/31.4

2015/0285835 A1* 10/2015 Karahan ................. G01P 21/00 73/1.38

2016/0058093 A1* 3/2016 Kennard ................ A63B 71/10 2/411

FOREIGN PATENT DOCUMENTS

TW 201443438 A 11/2014

OTHER PUBLICATIONS

Leuenberger et al., "Low-Power Sensor Module for Long-Term Activity Monitoring", IEEE EMBS, Masachusetts USA, Aug. 30-Sep. 3, 2011, pp. 2237-2241.*

(Continued)

*Primary Examiner* — Catherine T. Rastovski

(74) *Attorney, Agent, or Firm* — Womble Bond Dickinson (US) LLP

(57) ABSTRACT

A motion detecting device includes an accelerometer configured to generate gravitational acceleration readings associated respectively with consecutive time segments, an angular acceleration sensor and configured to generate angular acceleration readings, and a processor operable in one of a standby mode and an active mode. When operated in the standby mode, the processor activates the accelerometer, deactivates the angular acceleration sensor, and determines whether the user is in a substantial moving state. When determined that the user is in the substantial moving state, the processor switches to the active mode to activate both the accelerometer and said angular acceleration sensor, in order to determine the motion of the user.

15 Claims, 4 Drawing Sheets start
activate the accelerometer and deactivate the angular acceleration sensor — 402
receive only the gravitational acceleration readings — 404
the user is in the substantial moving state? — 406
no
yes
activate both the accelerometer and the angular acceleration sensor — 408
receive the gravitational acceleration readings and the angular acceleration reading — 410
determine the motion of the user, according to the gravitational acceleration readings and the angular acceleration reading — 412
end

(56) References Cited

OTHER PUBLICATIONS

Y. Chen, et al., "A Method to Calibrate Installation Orientation Errors of Inertial Sensors for Gait Analysis," Proceeding of the IEEE Information and Automation (ICIA), IEEE International Conference, pp. 598-603, Jul. 2014.
B. Florentino-Liano, et al., "Human Activity Recognition using Inertial Sensors with Invariance to Sensor Orientation," 2012 3rd International Workshop on Cognitive Incromation Processing (CIP), pp. 1-6, 2012.
G. Shi, et al., "Towards HMM based Human Motion Recognition using MEMS Inertial Sensors," Proceedings of the 2008 IEEE International Conference on Robotics and Biomimetics, pp. 1762-1766, Feb. 2009.

* cited by examiner

MOTION DETECTING DEVICE, MOTION DETECTING SENSOR UNIT AND MOTION DETECTION METHOD

CROSS-REFERENCE TO RELATED APPLICATION

This application claims priority of Taiwanese Patent Application No. 105116053, filed on May 24, 2016.

FIELD

The disclosure relates to a motion detecting device and a motion detecting sensor unit for performing motion detection.

BACKGROUND

Motion detecting mechanisms have been widely used in various fields including home care, motion training for athletes, video games, cinema, etc. A number of conventional motion detecting techniques exist for detecting motion of an object (e.g., a human being). For example, a video of an object may be captured, and image identification operations may be performed to determine motion of the object. Another example is to use a motion sensor unit that includes an accelerometer and an angular acceleration sensor and that can be mounted on or worn by the object, and to use the reading of the motion sensor unit (e.g., gravitational acceleration and angular acceleration) to determine the motion of the object. In general, the motion sensor unit may be included in a mobile device (e.g., a smartphone) or a wearable device.

However, in order to obtain more accurate results, all components of the motion sensor unit are always powered on, thereby potentially draining the power of the mobile device or the wearable device.

SUMMARY

One object of the disclosure is to provide a motion detecting device for detecting motion of a user.

According to one embodiment of the disclosure, the motion detecting device includes a housing to be carried by the user, an accelerometer, an angular acceleration sensor and a processor.

The accelerometer is disposed in the housing, and is configured to generate gravitational acceleration readings associated respectively with consecutive time segments.

The angular acceleration sensor is disposed in the housing, and is configured to generate an angular acceleration reading.

The processor is disposed in the housing, is coupled to the accelerometer and the angle acceleration sensor, and that is operable in one of a standby mode and an active mode.

When the processor operates in the standby mode, the processor activates the accelerometer, deactivates the angular acceleration sensor, and determines whether the user is in a substantial moving state according to at least one of the gravitational acceleration readings.

When it is determined by the processor that the user is in the substantial moving state, the processor switches to the active mode to activate both the accelerometer and the angular acceleration sensor, and to determine the motion of the user according to one of the gravitational acceleration readings that is associated with a current time segment and the angular acceleration reading.

Another object of the disclosure is to provide a motion detecting sensor unit.

According to one embodiment of the disclosure, the motion detecting sensor unit includes a housing to be provided to a user, an accelerometer that is disposed in the housing and that generates gravitational acceleration readings associated respectively with consecutive time segments, and an angular acceleration sensor that is disposed in the housing and that generates an angular acceleration reading when activated.

The motion detecting sensor unit is capable of operating in one of a standby mode and an active mode in response to a control signal. The control signal is generated using at least one of the gravitational acceleration readings.

When the motion detecting sensor unit is operating in the standby mode, the accelerometer is activated, and the angular acceleration sensor is deactivated.

When the motion detecting sensor unit is operating in the active mode, the accelerometer and the angular acceleration sensor are activated.

A further object of the disclosure is to provide a motion detection method for detecting motion of a user.

According to one embodiment of the disclosure, the motion detection method is implemented by a processor that communicates with an accelerometer and an angular acceleration sensor. The accelerometer and the angular acceleration sensor are carried by the user, and are capable of generating gravitational acceleration readings and an angular acceleration reading, respectively. The gravitational acceleration readings are associated respectively with consecutive time segments. The motion detection method includes:

a) activating the accelerometer and deactivating the angular acceleration sensor;

b) receiving only the gravitational acceleration readings from the accelerometer;

c) determining whether the user is in a substantial moving state according to at least one of the gravitational acceleration readings;

d) when it is determined that the user is in the substantial moving state, activating both the accelerometer and the angular acceleration sensor;

e) receiving the gravitational acceleration readings from the accelerometer and the angular acceleration reading from the angular acceleration sensor; and f) determining the motion of the user according to one of the gravitational acceleration readings that is associated with a current time segment and the angular acceleration reading.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
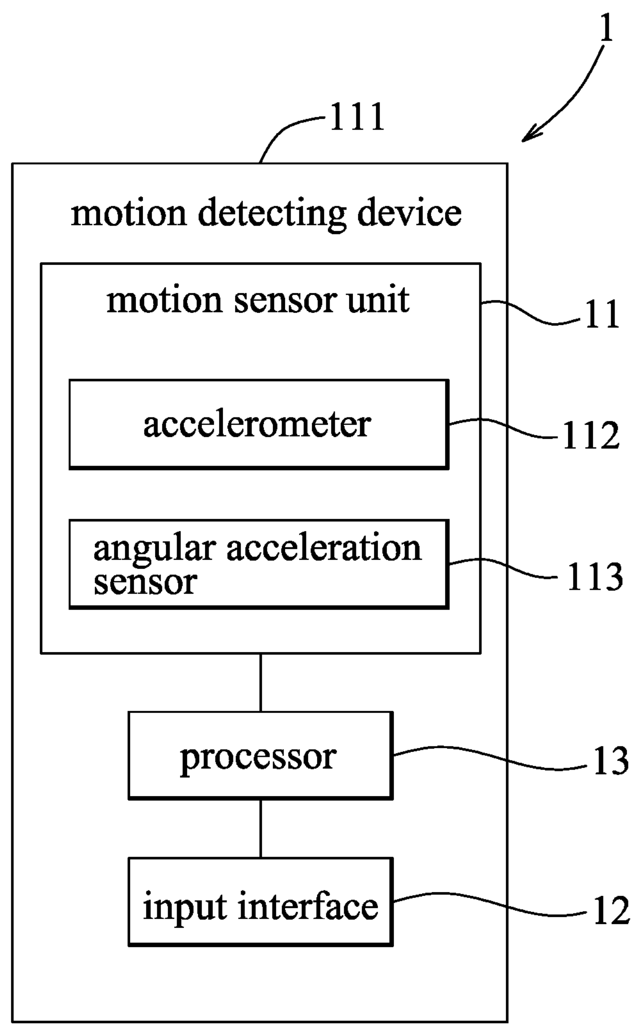
FIG. 1 is a block diagram illustrating a motion detecting device for detecting motion of a user, according to some embodiments of the disclosure.

FIG. 1 illustrates a block diagram of a motion detecting device 1 for detecting motion of a user, according to one embodiment of the disclosure. The motion detecting device 1 includes a housing 111, a motion sensor unit 11, an input interface 12 and a processor 13.

Figure 2:
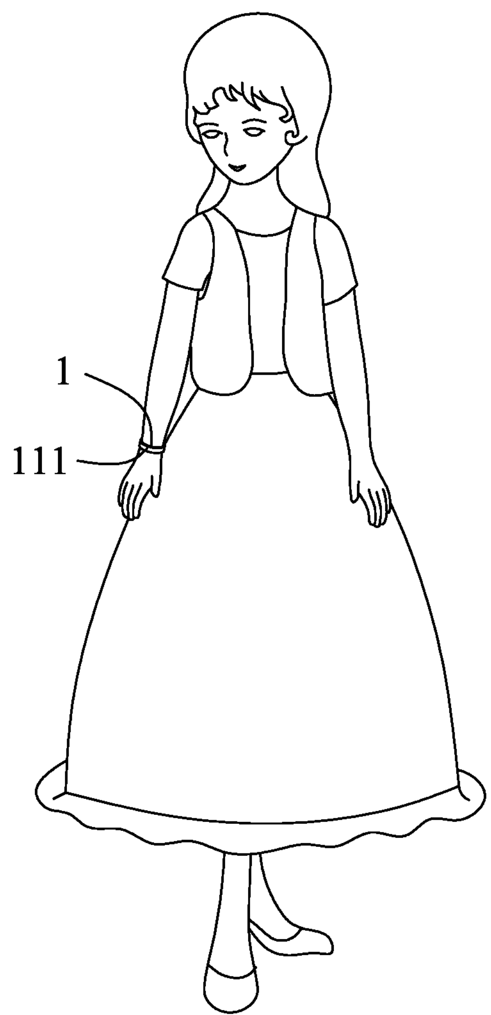
FIG. 2 illustrates the motion detecting device worn by a user.

In use, the motion sensor unit 11 and the processor 13 are disposed in the housing 111, which may be carried or wore by the user (as illustrated in FIG. 2). The input interface 12 may be disposed on an outer surface of the housing 111 for allowing the user to interact with the motion detecting device 1.

The motion sensor unit 11 includes an accelerometer 112 and an angular acceleration sensor 113. The accelerometer 112 is disposed in the housing 111, and is configured to generate a gravitational acceleration reading associated with a time segment. The gravitational acceleration reading may include three acceleration components (X, Y, Z) each corresponding to acceleration of the housing 111 in a respective one of first, second and third directions in space. Specifically, the acceleration component (Y) corresponds with the acceleration of the housing 111 in the first direction in space, the acceleration component (X) corresponds to the acceleration of the housing 111 in the second direction in space, and the acceleration component (Z) corresponds to the acceleration of the housing 111 in the third direction in space. The three acceleration components (X, Y, Z) constitute a 3×1 acceleration matrix $G_{3\times1}=[X, Y, Z]^T$.

The angular acceleration sensor 113 is disposed in the housing 111, and is configured to generate an angular acceleration reading when activated.

The processor 13 is communicatively coupled to the motion sensor unit 11 and the input interface 12. The processor 13 is operable in one of a standby mode and an active mode.

Specifically, when the processor 13 operates in the standby mode, the processor 13 activates the accelerometer 112, deactivates the angular acceleration sensor 113, and determines whether the user is in a substantial moving state according to the gravitational acceleration reading. When it is determined by the processor 13 that the user is not in the substantial moving state, the processor 13 is programmed to remain in the standby mode. The substantial moving state means that, for example, the user is in an active state (e.g., walking, doing exercise, etc.), rather than a static state (e.g., standing, sitting, lying, etc.).

On the other hand, when it is determined by the processor 13 that the user is in the substantial moving state, the processor 13 switches to the active mode to activate both the accelerometer 112 and the angular acceleration sensor 113, and proceeds to determine the motion of the user according to the gravitational acceleration reading and the angular acceleration reading. In use, the processor 13 may generate a control signal based on the gravitational acceleration reading, and transmit the control signal to the motion sensor unit 11. In response to receipt of the control signal, each of the accelerometer 112 and the angular acceleration sensor 113 of the motion sensor unit 11 may be activated or deactivated accordingly.

In some embodiments, before the motion detecting device 1 performs the operations for detecting the motion of the user, the processor 13 is programmed to perform a re-calibration operation for the gravitational acceleration reading using a re-calibration coefficient set. The object of the re-calibration operation is to eliminate inaccurate values in the gravitational acceleration reading resulted from the motion detecting device 1 being in a tilted state (e.g., being improperly worn by the user).

In use, in response to user input, the input interface 12 generates a re-calibration signal and transmits the same to the processor 13. In response to the re-calibration signal, the processor 13 generates a re-calibration coefficient matrix $C_{3\times3}$ serving as the re-calibration coefficient set.

Specifically, the processor 13 is programmed to first obtain two re-calibration gravitational acceleration readings from the accelerometer 112. In this embodiment, the two re-calibration gravitational acceleration readings are generated by the accelerometer 112 in two successive time instances.

Then, the processor 13 calculates three re-calibration matrices $C\mathbf{1}_{3\times3}$, $C\mathbf{2}_{3\times3}$ and $C\mathbf{3}_{3\times3}$ based on the two gravitational acceleration readings. Each of the re-calibration matrices $C\mathbf{1}_{3\times3}$, $C\mathbf{2}_{3\times3}$ and $C\mathbf{3}_{3\times3}$ is associated with a respective one of the first, second and third directions in space.

Using the re-calibration matrices $C\mathbf{1}_{3\times3}$, $C\mathbf{2}_{3\times3}$ and $C\mathbf{3}_{3\times3}$, the processor 13 calculates the re-calibration coefficient matrix $C_{3\times3}$ based on the equation $C_{3\times3}=C\mathbf{1}_{3\times3}\times C\mathbf{3}_{3\times3}\times C\mathbf{2}_{3\times3}$.

The calculation of the re-calibration coefficient matrix $C_{3\times3}$ may be implemented in the following manner.

The processor 13 is programmed to calculate, based on the two re-calibration gravitational acceleration readings, a first Euler angle (j) associated with the first direction, a second Euler angle (i) associated with the second direction and a third Euler angle (k) associated with the third direction. Then, the processor is programmed to calculate the re-calibration matrices $C\mathbf{1}_{3\times3}$, $C\mathbf{2}_{3\times3}$ and $C\mathbf{3}_{3\times3}$ based on the first Euler angle (j), the second Euler angle (i) and the third Euler angle (k).

Each of the two re-calibration gravitational acceleration readings includes a first acceleration component in the first direction, a second acceleration component in the second direction and a third acceleration component in the third direction.

The processor 13 determines that the two re-calibration gravitational acceleration readings are valid when one of the two readings has the first acceleration component (Y) being the greatest among the components in the one of the two readings and the other one of the two readings has the second or third acceleration component (X, Z) being the greatest among the components in the other one of the two readings, and designates the one of the two readings as a first reference set and the other one of the two readings as a second reference set. It is noted that, when the two re-calibration gravitational acceleration readings are not deemed to be valid (values not having the above-mentioned relationships), the processor 13 discards the two re-calibration gravitational acceleration readings and proceeds to obtain another two re-calibration gravitational acceleration readings from the accelerometer 112.

The processor 13 calculates the first Euler angle (j), the second Euler angle (i) and the third Euler angle (k) using the following equations:

$$\begin{cases} \text{when } Y_0 \leq 0 \text{ and } \mathrm{Y}_1 \leq 0,\ 1 = \tan^{-1}\left[\frac{Z_0}{Y_0}\right],\ k = \tan^{-1}\left[\frac{X_0}{-Y_0}\right] \\ \text{when } Y_0 > 0 \text{ and } Y_1 > 0,\ i = \tan^{-1}\left[\frac{Z_0}{Y_0}\right] + \pi,\ k = \tan^{-1}\left[\frac{X_0}{-Y_0}\right] + \pi \end{cases},$$

-continued $$\begin{cases} \text{when } Z_2' > 0,\ j = \pi - \tan^{-1}\left[\frac{-X_2}{Z_2}\right] \\ \text{when } Z_2' = 0,\ j = \tan^{-1}\left[\frac{-X_2}{Z_2}\right] = -\frac{\pi}{2} \text{ or } \frac{\pi}{2} \\ \text{when } Z_2' < 0,\ j = \tan^{-1}\left[\frac{X_2}{Z_2}\right] \end{cases},$$

where $Y_0$ represents the first acceleration component of the first reference set, $X_0$ represents the second acceleration component of the first reference set, $Z_0$ represents the third acceleration component of the first reference set, $Y_1=Y_0 \cos i+Z_0 \sin i$, the re-calibration matrix $C2_{3\times3}$ is defined as $$\begin{bmatrix} 1 & 0 & 0 \\ 0 & \cos i & -\sin i \\ 0 & \sin i & \cos i \end{bmatrix},$$

the re-calibration matrix $C3_{3\times3}$ is defined as $$\begin{bmatrix} \cos k & \sin k & 0 \\ -\sin k & \cos k & 0 \\ 0 & 0 & 1 \end{bmatrix}, \begin{bmatrix} X_2' \\ Y_2' \\ Z_2' \end{bmatrix} = \begin{bmatrix} \cos k & \sin k & 0 \\ -\sin k & \cos k & 0 \\ 0 & 0 & 1 \end{bmatrix} \times \begin{bmatrix} 1 & 0 & 0 \\ 0 & \cos i & -\sin i \\ 0 & \sin i & \cos i \end{bmatrix} \times \begin{bmatrix} X_2 \\ Y_2 \\ Z_2 \end{bmatrix},$$

the re-calibration matrix $C1_{3\times3}$ is defined as $$\begin{bmatrix} \cos j & 0 & \sin j \\ 0 & 1 & 0 \\ \sin j & 0 & \cos j \end{bmatrix},$$

$Y_2$ represents the first acceleration component of the second reference set, $X_2$ represents the second acceleration component of the second reference set, and $Z_2$ represents the third acceleration component of the second reference set.

After the re-calibration operation is completed, the processor 13 determines whether the user is in the substantial moving state, according to at least the re-calibration coefficient set and the gravitational acceleration readings that are generated by the accelerometer 112 during a specific time frame.

Figure 3:
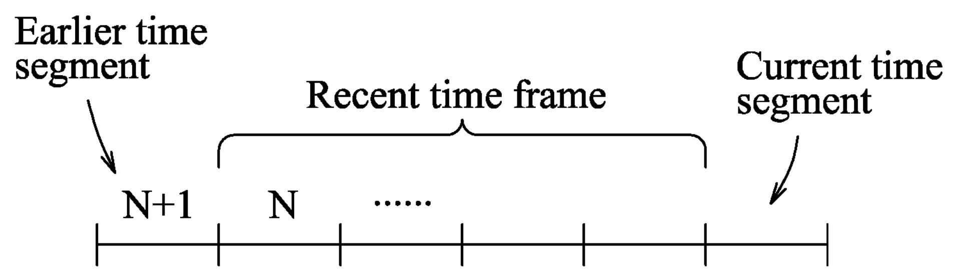
FIG. 3 illustrates various time periods used for determining whether the user is in a substantial moving state.

Specifically, in one embodiment as shown in FIG. 3, the specific time frame refers to a recent time frame, which precedes a current time segment immediately. The recent time frame includes a number N of recent time segments, where $N \geq 2$.

Accordingly, for each of the recent time segments, the accelerometer 112 generates a gravitational acceleration reading, and the processor 13 is programmed to calculate a 3×1 re-calibrated acceleration matrix $G'_{3\times1}=[X', Y', Z']^T$ for the gravitational acceleration reading. Specifically, the re-calibrated acceleration matrix $G'_{3\times1}$ is calculated using the equation $G'_{3\times1}=C_{3\times3}\times G_{3\times1}$. Each re-calibrated acceleration matrix $G'_{3\times1}$ includes three re-calibrated acceleration components (X', Y', Z').

When it is determined that at least one of the three re-calibrated acceleration components (X', Y', Z') is within a predetermined range, the processor 13 determines that the user is not in the substantial moving state and operates in the standby mode. In this embodiment, the predetermined range is between 0.8 g and 1 g.

It is noted that in one embodiment, the processor 13 determines whether the user is in the substantial moving state according to the re-calibration coefficient set and the gravitational acceleration reading that is generated by the accelerometer 112 during an earlier time segment that precedes the recent time frame (see FIG. 3). When the processor 13 is unable to make the determination using the gravitational acceleration reading generated during the earlier time segment, the gravitational acceleration readings generated during the recent time frame may then be used.

In another embodiment, the gravitational acceleration readings that are generated during both the recent time frame and the earlier time segment are used. That is to say, a number (N+1) of gravitational acceleration readings generated respectively at a number (N+1) of the time segments (i.e., the earlier time segment and the recent time segments) are used.

Specifically, when it is determined that: a) for the gravitational acceleration reading that is generated during the earlier time segment, a difference between a largest one of the three corresponding re-calibrated acceleration components (X', Y', Z') and a predetermined reference value is smaller than a predetermined threshold; or b) for each of the gravitational acceleration readings that are generated during the recent time segments, at least one of the three corresponding re-calibrated acceleration components (X', Y', Z') calculated by the processor 13 is within the predetermined range, the processor 13 determines that the user is not in the substantial moving state and operates in the standby mode. In this embodiment, the predetermined threshold is set at 0.4 g.

Specifically, when in the standby mode, the processor determines the motion of the user based on a gravitational acceleration reading generated within the current time segment, by using the re-calibration coefficient matrix $C3_{3\times3}$ to obtain a re-calibrated acceleration matrix $G'_{3\times1}$, and determining the motion of the user using the re-calibrated acceleration matrix $G'_{3\times1}$.

In one embodiment, a plurality of conditions are pre-established in the processor 13 and correspond respectively to a number of common wearing manners, in which the user wears the motion detecting device 1. In such cases, the processor 13 may be capable of determining that the user is wearing the motion detecting device 1 in one of the common wearing manners according to the conditions without doing the re-calibration operation.

Specifically, when the user wears the motion detecting device 1 in a first one of the common wearing manners, the processor 13 may obtain a gravitational acceleration reading from the accelerometer 112 and determine whether the gravitational acceleration reading satisfies one of the conditions pre-established therein.

For example, when the user is in a standing state, a gravitational acceleration reading that has the acceleration component (X) being the largest one among the components of the reading and having a value of 0.9 g satisfies one of the conditions. Subsequently, the processor 13 may determine that the user is in the standing state and wears the motion detecting device 1 in the first one of the common wearing manners.

In another example, when the user is in a lying state, a gravitational acceleration reading that has the acceleration component (Y) being the largest one among the components of the reading and having a value of 0.9 g satisfies another one of the conditions. Subsequently, the processor 13 may determine that the user is in the lying state, and wears the motion detecting device 1 in a second one of the common wearing manners.

In other examples, when the motion detecting device 1 is not worn in any one of the common wearing manners, a gravitational acceleration reading thus generated may not satisfy any one of the pre-established conditions. For example, when the user is in the standing state and wears the motion detecting device 1 in a specific manner not belonging to any one of the common wearing manners, a gravitational acceleration reading thus generated may have the acceleration component (Y) or (Z), rather than the acceleration component (X), being the largest one among the components of the reading. In such cases, the processor 13 is further programmed to require two entries of state data that correspond with the first reference set and the second reference set, respectively, for determining in the future a state of the user. Specifically, the entries of state data may be inputted by the user via the input interface 12 to indicate a specific state of the user, and are transmitted from the input interface 12 to the processor 13.

As a result, when the motion detecting device 1 operates in the standby mode, the processor 13 is programmed to determine the state of the user within the current time segment based on a gravitational acceleration reading generated within the current time segment, the two entries of state data, the first reference set and the second reference set. When the motion detecting device 1 operates in the active mode, the processor 13 is programmed to determine the motion of the user within the current time segment further based on an angular acceleration reading generated by the angular acceleration sensor 113 within the current time segment.

For example, when a condition that in the first reference set, the first acceleration component (Y) is the largest of the three acceleration components (X, Y, Z) and has a value (e.g., of 0.9 g) within the predetermined range, and that the entry of state data associated with the first reference set indicates that the user is currently in the standing state, the processor 13 may further store the above condition therein. Afterward, when an acceleration reading having a similar condition is received, the processor 13 is able to determine that the user is currently in the standing state.

In another example, when a condition that in the second reference set, the third acceleration component (Z) is the largest of the three acceleration components and is within the predetermined range (e.g., 0.9 g), and that the entry of state data associated with the first reference set indicates that the user is currently in the lying state, the processor 13 may further store such a condition therein. Afterward, when an acceleration reading having a similar condition is received, the processor 13 is able to determine that the user is currently in the lying state.

It is noted that, when the user is in one of the static states (e.g., standing, sitting, lying, etc.), one of the three re-calibrated acceleration components (X', Y', Z') calculated by the processor 13 is ideally within the predetermined range. Moreover, when the user is changing his/her position between the above static states, a difference between a largest one of the three re-calibrated acceleration components (X', Y', Z') and the predetermined reference value is ideally smaller than the predetermined threshold.

As a result, when the user is in one of the static states, the processor 13 is capable of performing with accuracy the determination of the state of the user with only the gravitational acceleration reading generated within the current time segment and the re-calibration coefficient matrix $C_{3\times3}$. As such, the processor 13 may operate in the standby mode and consume relatively less power without compromising the accuracy.

On the other hand, when it is determined that: i) for the gravitational acceleration reading that is generated during the earlier time segment, the difference between a largest one of the three corresponding re-calibrated acceleration components (X', Y', Z') and the predetermined reference value is not smaller than the predetermined threshold; and ii) for each of the gravitational acceleration readings that are generated during the recent time segments, all of the three corresponding re-calibrated acceleration components (X', Y', Z') calculated by the processor 13 are each not within the predetermined range, the processor 13 is switched to the active mode, activating the angular acceleration sensor 113.

As a result, the processor 13 is programmed to determine the motion of the user within the current time segment further based on the angular acceleration reading generated by the angular acceleration sensor 113 within the current time segment. It is noted that when the processor 13 operates in the active mode, the motion detecting operation may be performed using techniques that are known in the art, such as sensor fusion.

In one embodiment, when the processor 13 operates in the active mode, the processor 13 executes a Fourier transform operation on the gravitational acceleration reading and the re-calibration coefficient matrix $C_{3\times3}$ before the mot ion detecting operation. On the other hand, when the processor 13 operates in the standby mode, the processor 13 does not execute the Fourier transform operation. As such, power consumption of the processor 13 in the standby mode is less than that in the active mode, due to the angular acceleration sensor 113 being deactivated and the reduced number of arithmetic operations performed.

Figure 4:
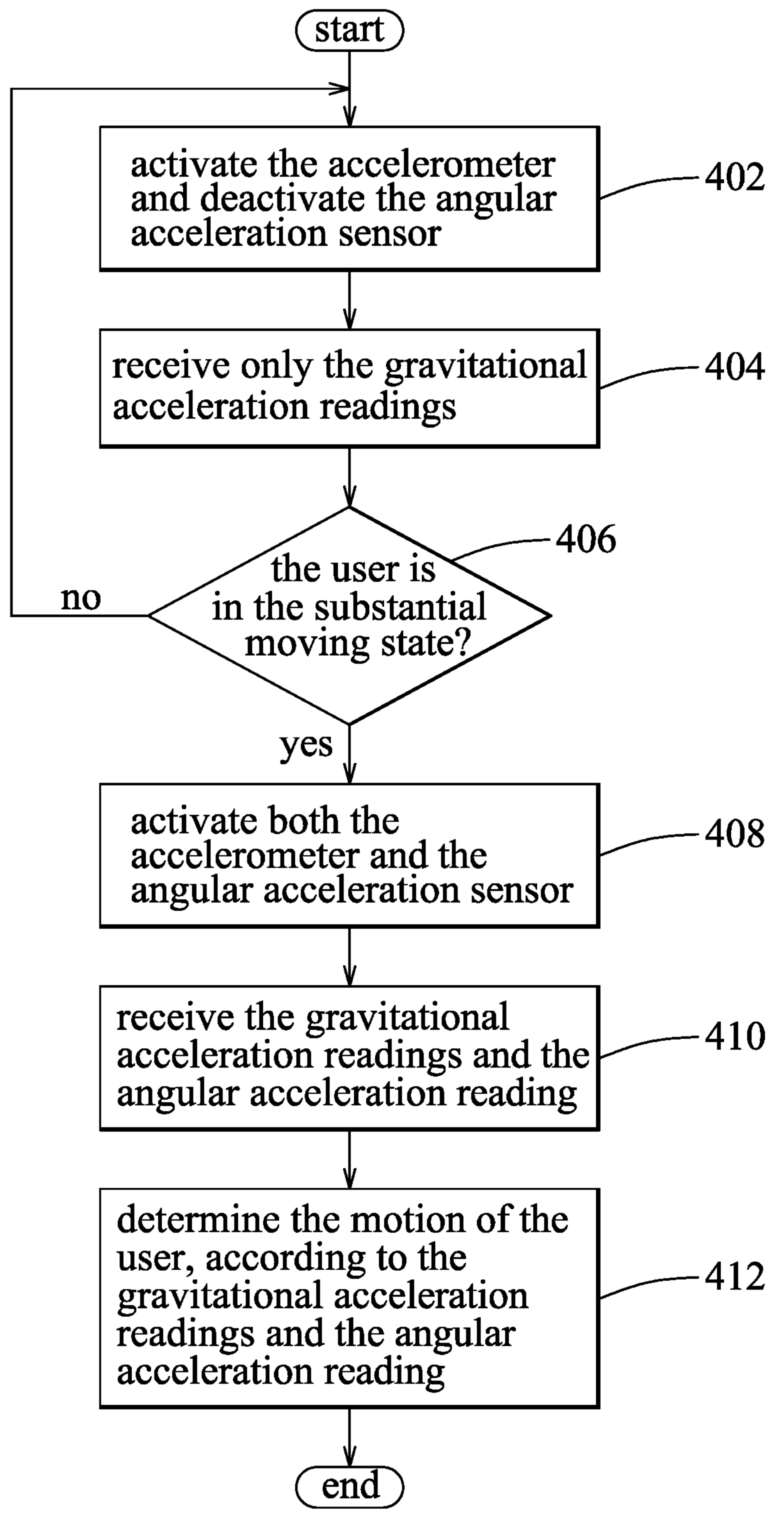
FIG. 4 is a flow chart of a motion detection method for detecting motion of a user according to some embodiments of the disclosure.

Referring to FIG. 4, a motion detection method for detecting motion of a user is provided according to some embodiments of the disclosure. Further referring to FIG. 1, the motion detection method may be implemented using a processor 13 that communicates with an accelerometer 112 and an angular acceleration sensor 113 that are carried by the user for generating a gravitational acceleration reading and an angular acceleration reading, respectively. Specifically, the method may be implemented by the motion detecting device 1 as previously described.

In step 402, the processor 13 activates the accelerometer 112 and deactivates the angular acceleration sensor 113. As such, the motion detecting device 1 initially operates in the standby mode.

Accordingly, in step 404, the processor 13 receives only the gravitational acceleration reading from the accelerometer 112.

Afterward, in step 406, the processor 13 determines whether the user is in the substantial moving state according to the gravitational acceleration reading. The manner in which the processor 13 makes the determination may be similar to that as previously described.

In step 408, when it is determined that the user is in the substantial moving state, the processor 13 activates both the accelerometer 112 and the angular acceleration sensor 113. As such, the motion detecting device 1 switches to the active mode.

Then, in step 410, the processor 13 receives the gravitational acceleration reading from the accelerometer 112, and receives the angular acceleration reading from the angular acceleration sensor 113.

Afterward, in step 412, the processor 13 is able to determine the motion of the user, according to the gravitational acceleration reading and the angular acceleration reading.

Figure 5:
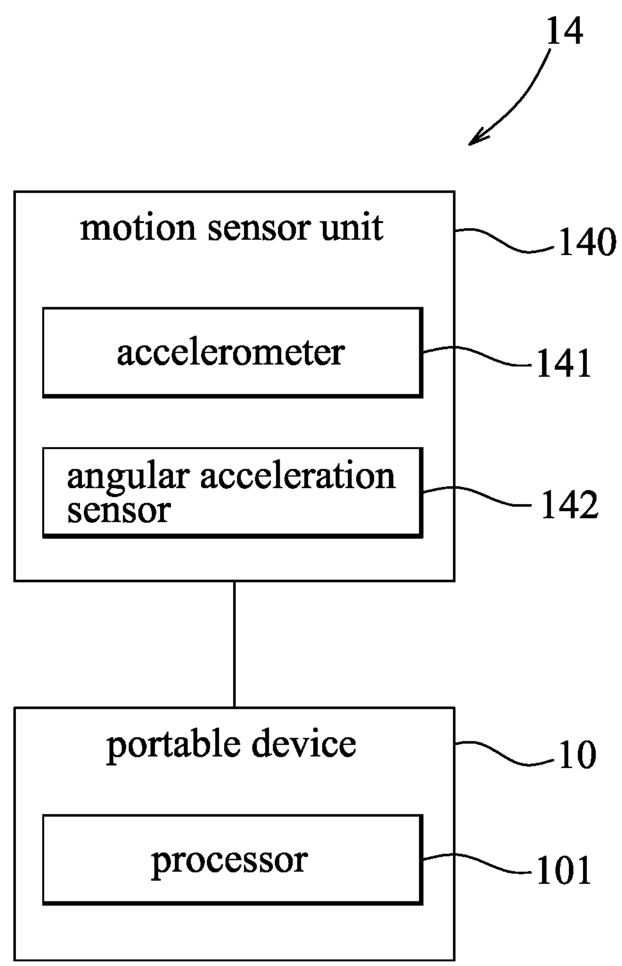
FIG. 5 is a block diagram illustrating a motion sensor unit according to some embodiments of the disclosure.

In one embodiment shown in FIG. 5, there is provided a motion sensor unit 14 capable of communication with a portable device 10 (e.g., a smartphone). The portable device 10 includes a processor 101 that is similar to the above-mentioned processor 13 of the motion detecting device 1 shown in FIG. 1.

The motion sensor unit 14 includes a housing 140 to be carried a user, an accelerometer 141 that is disposed in the housing 140 and that generates gravitational acceleration readings continuously, and an angular acceleration sensor 142 that is disposed in the housing 140 and that generates an angular acceleration reading when activated.

The motion sensor unit 14 is capable of operating in one of a power-saving mode and a full-power mode in response to a control signal from the processor 101. The control signal is generated by the processor 101 according to the gravitational acceleration reading in the above-mentioned manner.

When the motion sensor unit 14 is operating in the power-saving mode, the accelerometer 141 is activated and the angular acceleration sensor 142 is deactivated. The operation of the processor 101 based on the gravitational acceleration reading from the motion sensor unit 14 in the power-saving mode is similar to the operation of the processor 13 in the standby mode.

When the motion sensor unit 14 is operating in the full-power mode, the accelerometer 141 and the angular acceleration sensor 142 are both activated. The operation of the processor 101 based on the gravitational acceleration reading and the angular acceleration reading from the motion sensor unit 14 in the full-power mode is similar to the operation of the processor 13 in the active mode.

To sum up, the motion detecting device 1 as described in the disclosure provides a way to operate in the standby mode, in which only some of the components included in the motion detecting device 1 are deactivated, when it is determined that the user is not in the substantial moving state, and switches to operate in the active mode when it is determined that the user is in the substantial moving state. Such a configuration may reduce the overall power consumption of the motion detecting device 1 during operation. Further, the motion sensor unit 14 can also achieve the effect of saving power consumption.

Additionally, the motion detecting device 1 is capable of performing the re-calibration operation in case that the motion detecting device 1 is not properly worn by the user, thereby retaining the accuracy of the motion detecting operation.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A motion detecting device for detecting motion of a user, comprising:

a housing to be carried by the user;

an accelerometer that is disposed in said housing and that is configured to generate gravitational acceleration readings associated respectively with consecutive time segments;

an angular acceleration sensor that is disposed in said housing and that is configured to generate an angular acceleration reading; and a processor that is disposed in said housing, that is coupled to said accelerometer and said angle acceleration sensor, and that is operable in one of a standby mode and an active mode;

wherein, when said processor operates in the standby mode, said processor activates said accelerometer, deactivates said angular acceleration sensor, and determines whether the user is in a substantial moving state according to at least one of the gravitational acceleration readings; and wherein, when it is determined by said processor that the user is in the substantial moving state, said processor switches to the active mode to activate both said accelerometer and said angular acceleration sensor, and to determine the motion of the user according to one of the gravitational acceleration readings that is associated with a current time segment and the angular acceleration reading;

wherein said processor is programmed to perform a calibration operation for each of the gravitational acceleration readings using a calibration coefficient set, and to determine whether the user is in the substantial moving state according to the calibration coefficient set and the gravitational acceleration readings that are generated by said accelerometer;

each of the gravitational acceleration readings includes three acceleration components (Y, X, Z), each corresponding to acceleration of said housing in a respective one of first, second and third directions in space, the three acceleration components of each of the gravitational acceleration readings constituting a 3×1 acceleration matrix $G_{3\times1}=[X, Y, Z]^T$;

the calibration coefficient set includes a 3×3 calibration coefficient matrix $C_{3\times3}$;

in determining whether the user is in the substantial moving state, said processor is programmed to calculate a 3×1 calibrated acceleration matrix $G'_{3\times1}=C_{3\times3}\times G_{3\times1}$ that includes three calibrated acceleration components (X', Y', Z') corresponding to each of the gravitational acceleration readings;

when it is determined that at least one of the three calibrated acceleration components (X', Y', Z') corresponding to each of the gravitational acceleration readings is within a predetermined range, said processor determines that the user is not in the substantial moving state and operates in the standby mode;

wherein the motion detecting device further comprises an input interface that is disposed on said housing, and that is coupled to said processor, wherein, in response to user input, said input interface is programmed to generate a calibration signal and to transmit the same to said processor, and in response to the calibration signal, said processor generates the calibration coefficient matrix by:

obtaining two calibration gravitational acceleration readings from said accelerometer, the two calibration gravitational acceleration readings being generated by said accelerometer in two successive time instances;

calculating three calibration matrices $C1_{3\times3}$, $C2_{3\times3}$ and $C3_{3\times3}$, each of the calibration matrices being associated with a respective one of the first, second and third directions in space, based on the two calibration gravitational acceleration readings; and calculating the calibration coefficient matrix based on $C_{3\times3}=C1_{3\times3}\times C3_{3\times3}\times C2_{3\times3}$.

2. The motion detecting device of claim 1, wherein:

for each of a plurality of recent time segments preceding the current time segment, said accelerometer generates a gravitational acceleration reading, and said processor is programmed to calculate a 3×1 calibrated acceleration matrix $G'_{3\times1}$ for each of the gravitational acceleration readings associated with the recent time segments; and when it is determined that at least one of the three calibrated acceleration components (X', Y', Z') of the calibrated acceleration matrix $G'_{3\times1}$ corresponding to each of the gravitational acceleration readings associated with the recent time segments is within a predetermined range, said processor determines that the user is not in the substantial moving state and operates in the standby mode.

3. The motion detecting device of claim 1, wherein the predetermined range is between 0.8 g and 1 g.

4. The motion detecting device of claim 1, wherein when said processor operates in the active mode, the motion detecting operation of the user is performed using sensor fusion.

5. The motion detecting device of claim 1, wherein;

said processor is programmed to calculate, based on the two calibration gravitational acceleration readings, a first Euler angle associated with the first direction, a second Euler angle associated with the second direction and a third Euler angle associated with the third direction, and to calculate the calibration coefficient matrices based on the first Euler angle, the second Euler angle and the third Euler angle.

6. The motion detecting device of claim 5, wherein:

each of the two calibration gravitational acceleration readings includes a first acceleration component in the first direction, a second acceleration component in the second direction and a third acceleration component in the third direction;

said processor determines that the two calibration gravitational acceleration readings are valid when one of the two calibration gravitational acceleration readings has the first acceleration component being a greatest acceleration component in the one of the two calibration gravitational acceleration readings and the other one of the two calibration gravitational acceleration readings has one of the second acceleration component and the third acceleration component being a greatest acceleration component in the other one of the two calibration gravitational acceleration readings, and designates the one of the two calibration gravitational acceleration readings as a first reference set and the other one of the two calibration gravitational acceleration readings as a second reference set;

said processor calculates the first Euler angle, a second Euler angle and a third Euler angle using the following equations:

$$\begin{cases} \text{when } Y_0 \le 0 \text{ and } Y_1 \le 0,\ 1 = \tan^{-1}\left[\frac{Z_0}{Y_0}\right],\ k = \tan^{-1}\left[\frac{X_0}{-Y_0}\right] \\ \text{when } Y_0 > 0 \text{ and } Y_1 > 0,\ i = \tan^{-1}\left[\frac{Z_0}{Y_0}\right] + \pi,\ k = \tan^{-1}\left[\frac{X_0}{-Y_0}\right] + \pi \end{cases},$$

$$\begin{cases} \text{when } Z_2' > 0,\ j = \pi - \tan^{-1}\left[\frac{-X_2}{Z_2}\right] \\ \text{when } Z_2' = 0,\ j = \tan^{-1}\left[\frac{-X_2}{Z_2}\right] = -\frac{\pi}{2} \text{ or } \frac{\pi}{2} \\ \text{when } Z_2' < 0,\ j = \tan^{-1}\left[\frac{X_2}{Z_2}\right] \end{cases},$$

where $Y_0$ represents the first acceleration component of the first reference set, $X_0$ represents the second acceleration component of the first reference set, $Z_0$ represents the third acceleration component of the first reference set, $Y_1=Y_0 \cos i+Z_0 \sin i$, j represents the first Euler angle, i represents the second Euler angle, k represents the third Euler angle, the calibration matrix $C2_{3\times3}$ is defined as $$\begin{bmatrix} 1 & 0 & 0 \\ 0 & \cos i & -\sin i \\ 0 & \sin i & \cos i \end{bmatrix},$$

the calibration matrix $C3_{3\times3}$ is defined as $$\begin{bmatrix} \cos k & \sin k & 0 \\ -\sin k & \cos k & 0 \\ 0 & 0 & 1 \end{bmatrix}, \begin{bmatrix} X_2' \\ Y_2' \\ Z_2' \end{bmatrix} = \begin{bmatrix} \cos k & \sin k & 0 \\ -\sin k & \cos k & 0 \\ 0 & 0 & 1 \end{bmatrix} \times \begin{bmatrix} 1 & 0 & 0 \\ 0 & \cos i & -\sin i \\ 0 & \sin i & \cos i \end{bmatrix} \times \begin{bmatrix} X_2 \\ Y_2 \\ Z_2 \end{bmatrix},$$

the calibration matrix $C1_{3\times3}$ is defined as $$\begin{bmatrix} \cos j & 0 & \sin j \\ 0 & 1 & 0 \\ \sin j & 0 & \cos j \end{bmatrix},$$

$Y_2$ represents the first acceleration component of the second reference set, $X_2$ represents the second acceleration component of the second reference set, and $Z_2$ represents the third acceleration component of the second reference set.

7. The motion detecting device of claim 6, wherein:

said processor is further programmed to receive two entries of state data from said input interface, the two entries of state data corresponding to the first reference set and the second reference set, respectively;

when said motion detecting device operates in the standby mode, said processor is programmed to determine the motion of the user within the current time segment based on one of gravitational acceleration readings that is generated within the current time segment, the two entries of state data, the first reference set and the second reference set; and when said motion detecting device operates in the active mode, said processor is programmed to determine the motion of the user within the current time period further based on the angular acceleration reading that is generated by said angular acceleration sensor within the current time segment.

8. A motion detecting device for detecting motion of a user, comprising:

a housing to be carried by the user;

an accelerometer that is disposed in said housing and that is configured to generate gravitational acceleration readings associated respectively with consecutive time segments;

an angular acceleration sensor that is disposed in said housing and that is configured to generate an angular acceleration reading; and a processor that is disposed in said housing, that is coupled to said accelerometer and said angle acceleration sensor, and that is operable in one of a standby mode and an active mode;

wherein, when said processor operates in the standby mode, said processor activates said accelerometer, deactivates said angular acceleration sensor, and determines whether the user is in a substantial moving state according to at least one of the gravitational acceleration readings; and wherein, when it is determined by said processor that the user is in the substantial moving state, said processor switches to the active mode to activate both said accelerometer and said angular acceleration sensor, and to determine the motion of the user according to one of the gravitational acceleration readings that is associated with a current time segment and the angular acceleration reading;

wherein said processor is programmed to perform a calibration operation for an earlier one of gravitational acceleration readings using a calibration coefficient set, and to determine whether the user is in the substantial moving state according to the calibration coefficient set and the earlier one of the gravitational acceleration readings, the earlier one of the gravitational acceleration readings being generated by said accelerometer during an earlier time segment before the current time segment;

wherein:

each of the gravitational acceleration readings includes three acceleration components (Y, X, Z) corresponding to acceleration of said housing in a respective one of first, second and third directions in space, the three acceleration components of each of the gravitational acceleration readings constituting a 3×1 acceleration matrix $G_{3\times1}=[X, Y, Z]^T$;

the calibration coefficient set includes a 3×3 calibration coefficient matrix $C_{3\times3}$; and in determining whether the user is in the substantial moving state, said processor is programmed to calculate a 3×1 calibrated acceleration matrix $G'_{3\times1}=(X', Y', Z')^T=C_{3\times3}\times G_{3\times1}$ from the earlier one of the gravitational acceleration readings, the calibrated acceleration matrix including three calibrated acceleration components (X', Y', Z');

when it is determined that a difference between a largest one of the three calibrated acceleration components (X', Y', Z') and a predetermined reference value is smaller than a predetermined threshold, said processor determines that the user is not in the substantial moving state and operates in the standby mode.

9. The motion detecting device of claim 8, wherein the predetermined threshold is 0.4 g.

10. The motion detecting device of claim 8, further comprising an input interface that is disposed on said housing, and that is coupled to said processor, wherein, in response to user input, said input interface is programmed to generate a calibration signal and to transmit the same to said processor, and in response to the calibration signal, said processor generates the calibration coefficient matrix by:

obtaining two calibration gravitational acceleration readings from said accelerometer, the two calibration gravitational acceleration readings being generated by said accelerometer in two successive time instances;

calculating three calibration matrices $C\mathbf{1}_{3\times3}$, $C\mathbf{2}_{3\times3}$ and $C\mathbf{3}_{3\times3}$, each of the calibration matrices being associated with a respective one of the first, second and third directions in space, based on the two calibration gravitational acceleration readings; and calculating the calibration coefficient matrix based on $C_{3\times3}=C\mathbf{1}_{3\times3}\times C\mathbf{3}_{3\times3}\times C\mathbf{2}_{3\times3}$.

11. The motion detecting device of claim 10, wherein;

said processor is programmed to calculate, based on the two calibration gravitational acceleration readings, a first Euler angle associated with the first direction, a second Euler angle associated with the second direction and a third Euler angle associated with the third direction, and to calculate the calibration coefficient matrices based on the first Euler angle, the second Euler angle and the third Euler angle.

12. The motion detecting device of claim 11, wherein:

each of the two calibration gravitational acceleration readings includes a first acceleration component in the first direction, a second acceleration component in the second direction and a third acceleration component in the third direction;

said processor determines that the two calibration gravitational acceleration readings are valid when one of the two calibration gravitational acceleration readings has the first acceleration component being a greatest acceleration component in the one of the two calibration gravitational acceleration readings and the other one of the two calibration gravitational acceleration readings has one of the second acceleration component and the third acceleration component being a greatest acceleration component in the other one of the two calibration gravitational acceleration readings, and designates the one of the two calibration gravitational acceleration readings as a first reference set and the other one of the two calibration gravitational acceleration readings as a second reference set;

said processor calculates the first Euler angle, a second Euler angle and a third Euler angle using the following equations:

$$\begin{cases} \text{when } Y_0 \le 0 \text{ and } Y_1 \le 0,\ 1 = \tan^{-1}\left[\frac{Z_0}{Y_0}\right],\ k = \tan^{-1}\left[\frac{X_0}{-Y_0}\right] \\ \text{when } Y_0 > 0 \text{ and } Y_1 > 0,\ i = \tan^{-1}\left[\frac{Z_0}{Y_0}\right]+\pi,\ k = \tan^{-1}\left[\frac{X_0}{-Y_0}\right]+\pi \end{cases},$$

-continued $$\begin{cases} \text{when } Z_2' > 0,\ j = \pi - \tan^{-1}\left[\frac{-X_2}{Z_2}\right] \\ \text{when } Z_2' = 0,\ j = \tan^{-1}\left[\frac{-X_2}{Z_2}\right] = -\frac{\pi}{2} \text{ or } \frac{\pi}{2} \\ \text{when } Z_2' < 0,\ j = \tan^{-1}\left[\frac{X_2}{Z_2}\right] \end{cases},$$

where $Y_0$ represents the first acceleration component of the first reference set, $X_0$ represents the second acceleration component of the first reference set, $Z_0$ represents the third acceleration component of the first reference set, $Y_1=Y_0 \cos i+Z_0 \sin i$, j represents the first Euler angle, i represents the second Euler angle, k represents the third Euler angle, the calibration matrix $C\mathbf{2}_{3\times3}$ is defined as $$\begin{bmatrix} 1 & 0 & 0 \\ 0 & \cos i & -\sin i \\ 0 & \sin i & \cos i \end{bmatrix},$$

the calibration matrix $C\mathbf{3}_{3\times3}$ is defined as $$\begin{bmatrix} \cos k & \sin k & 0 \\ -\sin k & \cos k & 0 \\ 0 & 0 & 1 \end{bmatrix}, \begin{bmatrix} X_2' \\ Y_2' \\ Z_2' \end{bmatrix} = \begin{bmatrix} \cos k & \sin k & 0 \\ -\sin k & \cos k & 0 \\ 0 & 0 & 1 \end{bmatrix} \times \begin{bmatrix} 1 & 0 & 0 \\ 0 & \cos i & -\sin i \\ 0 & \sin i & \cos i \end{bmatrix} \times \begin{bmatrix} X_2 \\ Y_2 \\ Z_2 \end{bmatrix},$$

the calibration matrix $C\mathbf{1}_{3\times3}$ is defined as $$\begin{bmatrix} \cos j & 0 & \sin j \\ 0 & 1 & 0 \\ \sin j & 0 & \cos j \end{bmatrix},$$

$Y_2$ represents the first acceleration component of the second reference set, $X_2$ represents the second acceleration component of the second reference set, and $Z_2$ represents the third acceleration component of the second reference set.

13. The motion detecting device of claim 12, wherein:

said processor is further programmed to receive two entries of state data from said input interface, the two entries of state data corresponding to the first reference set and the second reference set, respectively;

when said motion detecting device operates in the standby mode, said processor is programmed to determine the motion of the user within the current time segment based on one of gravitational acceleration readings that is generated within the current time segment, the two entries of state data, the first reference set and the second reference set; and when said motion detecting device operates in the active mode, said processor is programmed to determine the motion of the user within the current time period further based on the angular acceleration reading that is generated by said angular acceleration sensor within the current time segment.

14. A motion detection method for detecting motion of a user, the motion detection method to be implemented by a processor that communicates with an accelerometer and an angular acceleration sensor, the accelerometer and the angular acceleration sensor being carried by the user and being capable of generating gravitational acceleration readings and an angular acceleration reading, respectively, the gravitational acceleration readings being associated respectively with consecutive time segments, the motion detection method comprising:

a) activating the accelerometer and deactivating the angular acceleration sensor;

b) receiving only the gravitational acceleration readings from the accelerometer;

c) determining whether the user is in a substantial moving state according to at least one of the gravitational acceleration readings;

d) when it is determined that the user is in the substantial moving state, activating both the accelerometer and the angular acceleration sensor;

e) receiving the gravitational acceleration readings from the accelerometer and the angular acceleration reading from the angular acceleration sensor; and f) determining the motion of the user according to one of the gravitational acceleration readings that is associated with a current time segment and the angular acceleration reading; wherein:

the processor is programmed to perform a calibration operation for each of the gravitational acceleration readings using a calibration coefficient set, and to determine whether the user is in the substantial moving state according to the calibration coefficient set and the gravitational acceleration readings that are generated by the accelerometer;

each of the gravitational acceleration readings includes three acceleration components (Y, X, Z), each corresponding to acceleration of the housing in a respective one of first, second and third directions in space, the three acceleration components of each of the gravitational acceleration readings constituting a 3×1 acceleration matrix $G_{3\times1}=[X, Y, Z]^T$;

the calibration coefficient set includes a 3×3 calibration coefficient matrix $C_{3\times3}$;

in determining whether the user is in the substantial moving state, the processor is programmed to calculate a 3×1 calibrated acceleration matrix $G'_{3\times1}=C_{3\times3}\times G_{3\times1}$ that includes three calibrated acceleration components (X', Y', Z') corresponding to each of the gravitational acceleration readings; and when it is determined that at least one of the three calibrated acceleration components (X', Y', Z') corresponding to each of the gravitational acceleration readings is within a predetermined range, the processor determines that the user is not in the substantial moving state and operates in the standby mode;

wherein the processor is coupled to an input interface, and, in response to user input, the input interface is programmed to generate a calibration signal and to transmit the same to the processor, and wherein, the calculating of the calibration coefficient matrix includes in response to the calibration signal:

obtaining two calibration gravitational acceleration readings from the accelerometer, the two calibration gravitational acceleration readings being generated by the accelerometer in two successive time instances;

calculating three calibration matrices $C\mathbf{1}_{3\times3}$, $C\mathbf{2}_{3\times3}$ and $C\mathbf{3}_{3\times3}$, each of the calibration matrices being associated with a respective one of the first, second and third directions in space, based on the two calibration gravitational acceleration readings; and calculating the calibration coefficient matrix based on $C_{3\times3}=C\mathbf{1}_{3\times3}\times C\mathbf{3}_{3\times3}\times C\mathbf{2}_{3\times3}$.

15. A motion detection method for detecting motion of a user, the motion detection method to be implemented by a processor that communicates with an accelerometer and an angular acceleration sensor, the accelerometer and the angular acceleration sensor being carried by the user and being capable of generating gravitational acceleration readings and an angular acceleration reading, respectively, the gravitational acceleration readings being associated respectively with consecutive time segments, the motion detection method comprising:

a) activating the accelerometer and deactivating the angular acceleration sensor;

b) receiving only the gravitational acceleration readings from the accelerometer;

c) determining whether the user is in a substantial moving state according to at least one of the gravitational acceleration readings;

d) when it is determined that the user is in the substantial moving state, activating both the accelerometer and the angular acceleration sensor;

e) receiving the gravitational acceleration readings from the accelerometer and the angular acceleration reading from the angular acceleration sensor; and f) determining the motion of the user according to one of the gravitational acceleration readings that is associated with a current time segment and the angular acceleration reading;

wherein the processor is programmed to perform a calibration operation for an earlier one of gravitational acceleration readings using a calibration coefficient set, and to determine whether the user is in the substantial moving state according to the calibration coefficient set and the earlier one of the gravitational acceleration readings, the earlier one of the gravitational acceleration readings being generated by the accelerometer during an earlier time segment before the current time segment;

wherein:

each of the gravitational acceleration readings includes three acceleration components (Y, X, Z) corresponding to acceleration of the housing in a respective one of first, second and third directions in space, the three acceleration components of each of the gravitational acceleration readings constituting a 3×1 acceleration matrix $G_{3\times1}=[X, Y, Z]^T$;

the calibration coefficient set includes a 3×3 calibration coefficient matrix $C_{3\times3}$;

in determining whether the user is in the substantial moving state, the processor is programmed to calculate a 3×1 calibrated acceleration matrix $G'_{3\times1}=(X', Y', Z')^T=C_{3\times3}\times G_{3\times1}$ from the earlier one of the gravitational acceleration readings, the calibrated acceleration matrix including three calibrated acceleration components (X', Y', Z');

when it is determined that a difference between a largest one of the three calibrated acceleration components (X', Y', Z') and a predetermined reference value is smaller than a predetermined threshold, the processor determines that the user is not in the substantial moving state and operates in the standby mode.

* * * * *